UNITED STATES PATENT OFFICE.

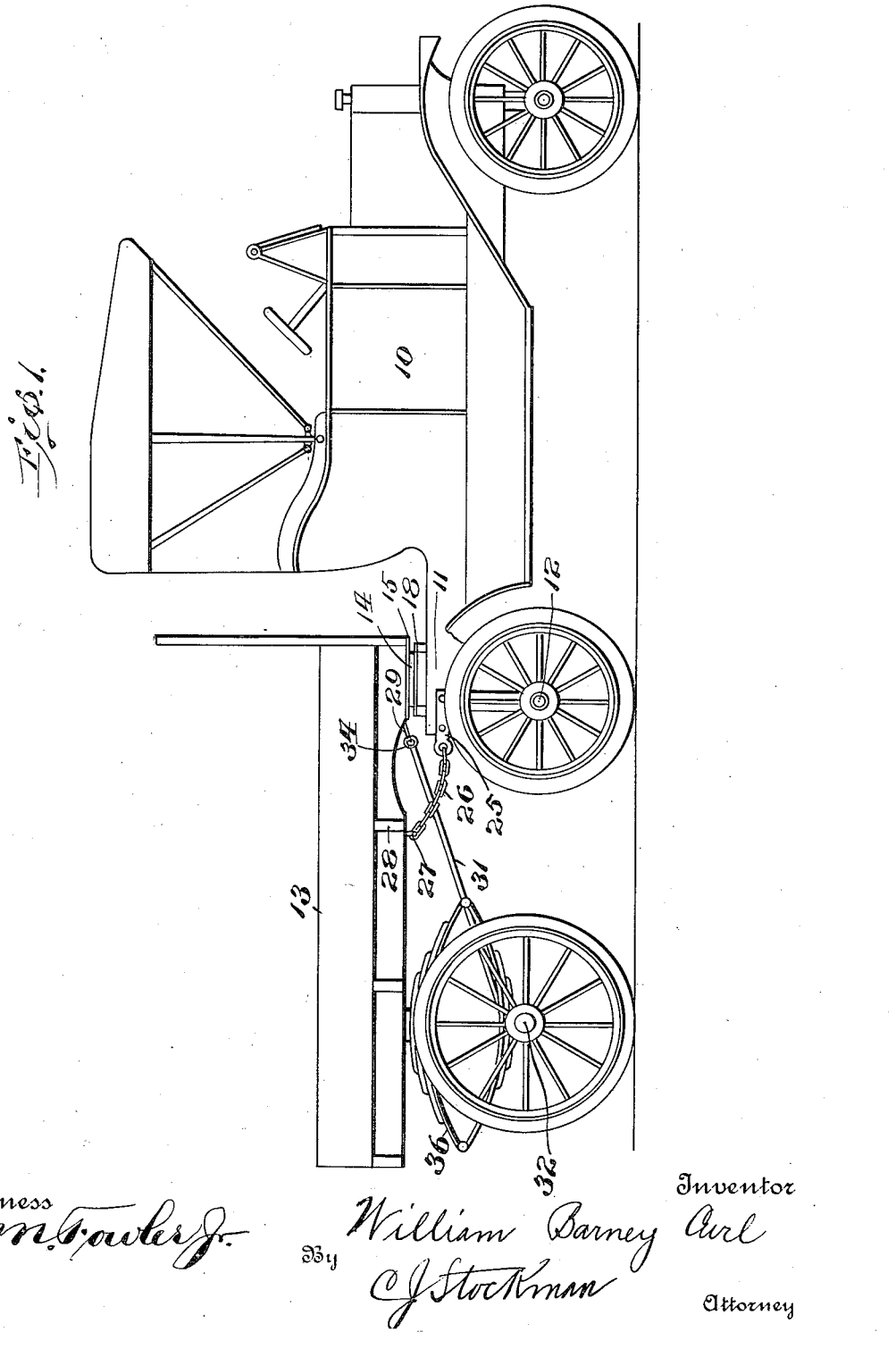

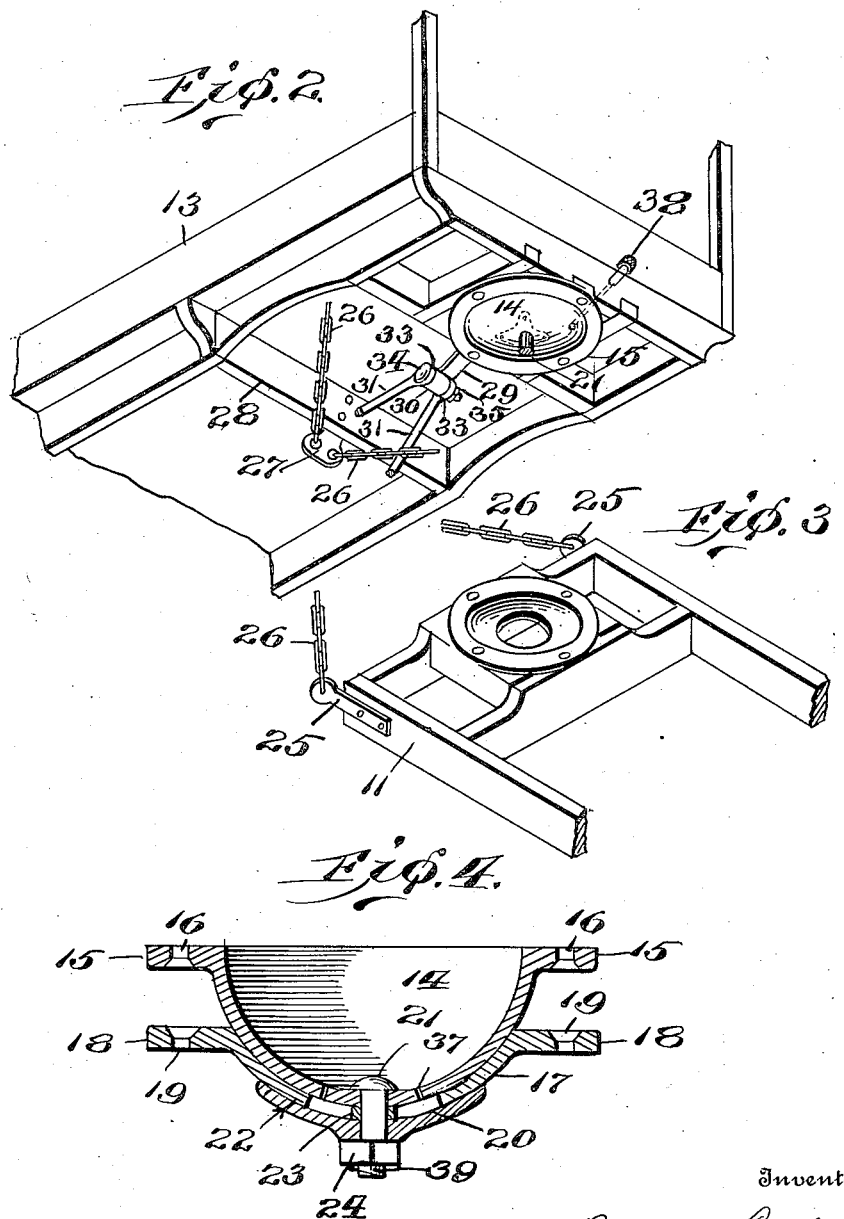

WILLIAM BARNEY CURL, OF LOUISVILLE, KENTUCKY, ASSIGNOR OF ONE-HALF TO ARTHUR T. SHRADER, OF NEW ALBANY, INDIANA.

COMBINED TRACTOR AND TRAILER.

1,211,825.    Specification of Letters Patent.    Patented Jan. 9, 1917.

Application filed March 28, 1916. Serial No. 87,203.

*To all whom it may concern:*

Be it known that I, WILLIAM BARNEY CURL, a citizen of the United States, residing at Louisville, in the county of Jefferson and State of Kentucky, have invented certain new and useful Improvements in Combined Tractors and Trailers, of which the following is a specification.

This invention relates to combined vehicles consisting of tractors, or forward motor or otherwise operated vehicles, and trailers or rear vehicles securable to and drawn by the forward vehicles, or tractors, which will ordinarily be automobile or like power vehicles.

Numerous difficulties and objections have been encountered in attempted practical operation of such devices and after exhaustive study of known devices and constructions in this line, with a view to overcoming such objections and difficulties, I have invented and practically tested the constructed subject of this invention.

The objects of the invention may be briefly stated as follows: 1. To provide an improved fifth wheel connection for a tractor and a trailer of a very simple, inexpensive and practical construction, which may be quickly adjusted into operative position or out of it, rendering errors in setting up, well nigh impossible. 2. To provide other improved connecting parts to coöperate with the fifth wheel and to maintain correct operative connections of the tractors and trailers.

With these, and other objects, which may hereinafter develop, in view, the invention consists in the improved construction, arrangement and combination of parts hereinafter fully described and afterward claimed.

In order that the construction and operation thereof may be readily comprehended, I have illustrated one approved embodiment of my invention in the accompanying drawings, and will now proceed to fully describe the same, having reference to said drawings, on which—

Figure 1 represents, in side elevation, a tractor and a trailer connected together in accordance with my invention. Fig. 2 represents, in perspective, the underside of the forward portion of the trailer. Fig. 3 represents, in perspective, the upper side of the tractor. Fig. 4 represents a sectional view, on a vertical diametric plane cutting through the fifth wheel, detached from the vehicles.

Like reference characters mark the same parts in all of the figures of the drawings.

Referring specifically to the drawings 10 indicates the tractor, in this instance an ordinary automobile, although it might be any class of motor vehicle, or even an animal drawn vehicle, the only requirement for the purposes of my invention being that it shall have a rearwardly projecting platform, as at 11, to receive the lower member of the fifth wheel which will be located substantially vertically above the rear axle 12.

The trailer is indicated at 13, which may be a vehicle of any known class, such as a bus, a truck or other wagon, provision being made at its forward end for connecting the upper member of a fifth wheel, the usual forward axle and wheels being omitted.

My improved fifth wheel, as illustrated in detail in Figs. 2, 3 and 4, comprises an upper bearing member 14 of substantially semi-spherical form provided with a peripheral horizontal flange at 15, having holes 16 through which to insert bolts or screws for attaching it to the underside of the forward part of the trailer 13.

The fifth wheel further comprises a lower, partly spherical bearing member 17 having a peripheral horizontal flange 18 with holes 19 therein to receive bolts or screws to attach it to the platform 11, and provided with a central circular hole or opening 20 for a purpose later specified.

The lower bearing member 17 forms a seat and support for the upper bearing member 14 which is held in its seat by means of a bolt 21 passed downward through an open bolt-hole in the center of the member 14, through the central opening 20 in the member 17, and through a bolt-hole in the center of a lower cup-shaped clamping member 22 which fits on the lower face of the member 17 and is of sufficient diameter to always close the opening 20, said bolt having a washer or ferrule 23 upon it between the members 14 and 22 and a nut 24 on its lower end to be screwed upon the bolt against the lower clamping member 22 to firmly hold all the members together, the ferrule 23 maintaining the members 14 and 22 at a proper distance apart to prevent too great friction.

Upon the outside of the rear end of the side pieces of the platform 11 are suitably secured, as by bolts, screws or the like, brackets 25 to which are attached the forward ends of chains 26, the rear ends of which chains are secured centrally to the trailer 13, shown in this instance as attached to a bracket 27 depending from and secured by any suitable fastenings to a cross-beam 28 of the body of the trailer. This attachment of the body of the tractor with the body of the trailer forms a safety device to prevent accidental folding or buckling sidewise of the trailer on the tractor in the event that an unskilled operator turns wrong in backing. If the trailer turned too far in either direction in backing, this connection will prevent the sides of the tractor and trailer coming together if the operator continued backing.

Secured to and projecting centrally and rearwardly from the underside of the trailer is a bracket or bar 29 which terminates in a horizontal sleeve or eye 30. Rods 31, 31, secured to the rear axle 32 of the trailer 13 extend forwardly and upwardly and converge until they join the bracket 29 at their forward ends which terminate in eyes 33. A suitable bolt 34 or similar fastening, is passed through these eyes 33 and the eye 30, and secured by a nut 35, the bolt thus pivotally connecting the rods 31 to the bracket or bar 29.

The body of the trailer at the rear rests upon springs 36 mounted on the rear axle 32 and when the distance between the trailer body and the axle is varied by the compression and expansion of the springs, this variation is compensated for by the pivotal connection of the rods 31 to the bracket 29 just described.

The pull of the tractor being exerted on the body 13 of the trailer, the rods 31, by connecting the rear axle with the forward part of the trailer, prevent accidental displacement of the body forward from the axle and also relieve the springs 36 of the strain which would otherwise be brought upon them by the pull on the body.

By means of the constructions described the fifth wheel is made extremely simple and of low cost, and greatly facilitates the connecting and disconnecting of the tractor and trailer which is done by placing the single bolt 21 or displacing the same.

The only wearing parts are the parts 14 and 17 and these parts are held together by the part 22, but too great friction is prevented by the ferrule 23, which may be removed and another substituted when desirable or necessary.

The space or opening 20, when the parts are secured together permits any reasonable tilting movement of the part 14, with relation to the part 17 by giving room for such movement without the part 17 contacting with the bolt 21. The space 20 may also serve as a reservoir for oil fed through oil inlet 38 into member 14 and admitted through openings 37. The nut 24 may be locked on the bolt 21 by suitable means such as a cotter pin 39.

It will be observed that the fifth wheel supports the forward end of the trailer and is supported by the rear end of the tractor but it will be obvious that the fifth wheel may support any other device which it is desired to turn upon a supporting device, the latter to be substituted for the rear end of the tractor.

While I have specifically described the construction of the parts comprised in this embodiment of my invention, I do not confine myself to such specific constructions, as variations might be made therein without departing from the spirit and scope of the invention as hereinafter claimed.

Having thus fully described my invention, what I claim as new and desire to secure by Letters Patent of the United States is:

1. In combination, an upper supported device, a lower supporting device, and a universal connection between the same, said universal connection comprising an upwardly open substantially semi-spherical upper member rigidly secured to the upper supported device and having an opening at its axis, an upwardly open substantially semi-spherical lower member rigidly secured to the lower supporting device and having an opening at its axis of a greater diameter than the opening at the axis of the upper member, a clamping member receiving the lower member and having an axial opening of less diameter than the opening in the lower member, and a pivot, snugly fitting in the axial openings of the upper member and the clamping member and passing through the opening in the lower member, the last named opening forming an oil reservoir between the lower wall of the upper member, the upper wall of the clamping member and the surrounding wall of the opening.

2. A fifth wheel comprising two cup-shaped bearing members, one supporting the other and provided with an enlarged central opening, a clamping member, a pivotal attachment extending from the clamping member through the cup shaped members, and a removable ferrule on said pivotal attachment in the enlarged opening of the supporting cup shaped member.

3. A fifth wheel comprising an upright cup shaped, substantially semi-spherical upper bearing member provided with means for rigid attachment to the underside of an upper supported device and with a central opening, a lower upright cup shaped bearing member adapted to receive the upper member and provided with means for rigid attachment to the upper side of a lower supporting device and with an enlarged central opening, a clamping member for receiving the lower member and provided with a central opening, a pivotal connecting member passing through the openings of the upper cup shaped member and the clamping member and the enlarged opening of the lower bearing member for pivotally securing the upper and lower cup shaped members together, and a removable ferrule around the pivotal connecting member in the enlarged opening in the lower bearing member and between the upper bearing member and the clamping member.

4. A fifth wheel comprising a cup shaped, substantially semi-spherical upper bearing member provided with oil holes and a central bolt hole, a lower cup shaped bearing member adapted to receive the upper member and provided with an enlarged central opening, a clamping member for receiving the lower member and provided with a central bolt hole and a bolt passing through the bolt holes of the upper bearing member and the clamping member and the enlarged opening of the lower bearing member, the enlarged opening in the lower bearing members serving as a reservoir for oil passed through the oil holes.

5. A connection for a tractor and a trailer comprising a fifth wheel having an upper bearing member located under the forward end of the trailer and a lower bearing member secured to the upper side of the rear portion of the tractor, and converging chains connected to the sides of the tractor at their forward ends and to the transverse center of the trailer at their rear ends.

6. In combination, a tractor, a trailer, a fifth wheel having an upper bearing member located under the forward end of the trailer and a lower bearing member secured to the upper side of the rear portion of the tractor, rods connected at their rear ends to the rear axle of the trailer near the ends of the axle and at their forward ends pivotally connected to the trailer body substantially at its transverse center, and chains connected to the sides of the tractor at their forward ends and to the transverse center of the trailer at their rear ends.

In testimony whereof I affix my signature in the presence of two witnesses.

WILLIAM BARNEY CURL.

Witnesses:
BEN G. LUBBERS,
WM. PETER.